(12) United States Patent
Xiang et al.

(10) Patent No.: US 10,887,167 B2
(45) Date of Patent: Jan. 5, 2021

(54) ADAPTIVE SOFTWARE-DEFINED STORAGE FOR CLOUD STORAGE WORKLOADS

(71) Applicant: AT&T Intellectual Property I, L.P., Atlanta, GA (US)

(72) Inventors: Yu Xiang, Somerset, NJ (US); Yih-Farn Chen, Bridgewater, NJ (US); Kaustubh Joshi, Scotch Plains, NJ (US); Matti Hiltunen, Morristown, NJ (US); Richard Schlichting, New Providence, NJ (US); Keitaro Uehara, Tokyo (JP)

(73) Assignee: AT&T Intellectual Property I, L.P., Atlanta, GA (US)

( * ) Notice: Subject to any disclaimer, the term of this patent is extended or adjusted under 35 U.S.C. 154(b) by 115 days.

(21) Appl. No.: 15/966,548

(22) Filed: Apr. 30, 2018

(65) Prior Publication Data

US 2019/0334770 A1 Oct. 31, 2019

(51) Int. Cl.
*G06F 15/177* (2006.01)
*H04L 12/24* (2006.01)
*H04L 29/08* (2006.01)
*H04L 12/26* (2006.01)

(52) U.S. Cl.
CPC ...... *H04L 41/0816* (2013.01); *H04L 67/1097* (2013.01); *H04L 43/0876* (2013.01); *H04L 43/16* (2013.01)

(58) Field of Classification Search
CPC ............. H04L 41/0816; H04L 67/1097; H04L 43/0876; H04L 43/16; H04L 41/0803; H04L 41/0813; H04L 41/0866

USPC .......................... 709/220, 221, 222, 223, 224
See application file for complete search history.

(56) References Cited

U.S. PATENT DOCUMENTS

| 9,013,820 | B1* | 4/2015 | Camalig ............ G11B 20/1816 360/46 |
|---|---|---|---|
| 9,563,479 | B2 | 2/2017 | Ferris et al. |
| 9,582,379 | B2 | 2/2017 | Banerjee et al. |
| 9,684,542 | B2 | 6/2017 | Franco et al. |
| 9,716,746 | B2 | 7/2017 | Garg et al. |
| 9,742,690 | B2 | 8/2017 | Parikh et al. |
| 9,813,303 | B1 | 11/2017 | Guigli |
| 9,860,309 | B2 | 1/2018 | Doctor et al. |
| 9,870,211 | B2 | 1/2018 | Risbood et al. |
| 9,904,538 | B2 | 2/2018 | Piccinini et al. |
| 10,264,060 | B1* | 4/2019 | Rao ..................... H04L 67/1097 |
| 10,574,743 | B1* | 2/2020 | Ntofon .................. G06F 9/5077 |
| 2013/0318240 | A1* | 11/2013 | Hebert .................. G06F 9/5038 709/226 |

(Continued)

OTHER PUBLICATIONS

Weil et al.; "Ceph: a scalable, high-performance distributed file system"; OSDI Proceedings of the 7$^{th}$ Symposium on Operating systems design and implementation; Nov. 2006; p. 307-320.

(Continued)

*Primary Examiner* — Liang Che A Wang
(74) *Attorney, Agent, or Firm* — BakerHostetler

(57) ABSTRACT

Cloud-based orchestration may be leveraged to create flexible storage solutions that use continuous adaptation to tailor themselves to their target application workloads that made provide efficiencies in performance, cost, or scalability over conventional designs.

17 Claims, 11 Drawing Sheets

(56) References Cited

U.S. PATENT DOCUMENTS

| | | | | |
|---|---|---|---|---|
| 2014/0019965 | A1* | 1/2014 | Neuse | G06F 9/45533 718/1 |
| 2014/0019966 | A1* | 1/2014 | Neuse | G06F 9/45533 718/1 |
| 2014/0156813 | A1* | 6/2014 | Zheng | H04L 67/16 709/220 |
| 2015/0229521 | A1* | 8/2015 | Mayer | G06F 9/5072 709/222 |
| 2016/0323143 | A1* | 11/2016 | Kim | G06F 9/4411 |
| 2017/0034006 | A1* | 2/2017 | Rajapakse | H04L 41/12 |
| 2017/0155557 | A1* | 6/2017 | Desai | H04L 41/147 |
| 2017/0242729 | A1 | 8/2017 | Chen et al. | |
| 2017/0324813 | A1 | 11/2017 | Jain et al. | |
| 2019/0140894 | A1* | 5/2019 | Gujarathi | H04L 41/0806 |
| 2019/0317461 | A1* | 10/2019 | Pothukuchi | G05B 15/02 |

OTHER PUBLICATIONS

Weil et al.; "CRUSH: Controlled, Scalable, Decentralized Placement of Replicated Data"; ACM/IEEE Proceedings of the Conf. on Supercomputing; Nov. 2006; 12 pages.

Wang et al.; "qSDS: A QoS-aware I/O scheduling framework towards software defined storage"; ACM/IEEE Proceedings of the 11$^{th}$ Symposium on Architectures for networking and communications systems; 2015; p. 195-196.

Aggarwal et al.; "Sprout: A Functional Caching Approach to Minimize Service Latency in Erasure-Coded Storage"; IEEE/ACM Transactions on Networking; vol. 25 Issue 6; Dec. 2017; 16 pages.

Hsu et al.; "Inside-Out: Reliable Performance Prediction for Distributed Storage Systems in the Cloud"; IEEE 35th Symposium on Reliable Distributed Systems; 2016; 10 pages.

R. Hall; "Tools for Predicting the Reliability of Large-Scale Storage Systems"; ACM Transactions on Storage; vol. 12 Issue 4; Jul. 2016; 30 pages.

Sharov et al.; "Automatic Reconfiguration of Distributed Storage"; IEEE Int'l Conf. on Autonomic Computing; 2015; p. 133-134.

Shraer et al.; "Dynamic Reconfiguration of Primary/Backup Clusters"; USENIX Annual Technical Conference; Jun. 2012; 13 pages.

Yang et al.; "QoSC: A QoS-Aware Storage Cloud Based on HDFS"; IEEE Int'l Symposium on Security and Privacy in Social Networks and Big Data; Nov. 2015; p. 32-38.

Lin et al.; "Towards Fair Sharing of Block Storage in Multi-tenant Cloud"; 4$^{th}$ USENIX Workshops on Hot Topics in Cloud Computing; Jun. 2012; 6 pages.

Raghavan et al.; "Tiera: towards flexible multi-tiered cloud storage instances"; Proceedings of the 15$^{th}$ Int'l Middleware Conf.; Dec. 2014; 12 pages.

Shue et al.; "Performance Isolation and Fairness for Multi-Tenant Cloud Storage"; OSDI/USENIX Symposium on Operating Systems Design and Implementation; Oct. 2012; p. 349-362.

Gulati et al.; "PARDA: Proportional Allocation of Resources for Distributed Storage Access"; 7$^{th}$ USENIX FAST Conference; Feb. 2009; p. 85-98.

Madhyastha et al.; "scc: Cluster Storage Provisioning Informed by Application Characteristics and SLAs"; Proceedings of the 10$^{th}$ USENIX Conf. on File and Storage Technologies; 2012; 15 pages.

Thereska et al.; "IOFlow: a software-defined storage architecture"; Proceedings of the 24$^{th}$ ACM Symposium on Operating Systems Principles; Nov. 2013; p. 182-196.

Khan et al.; "Rethinking Erasure Codes for Cloud File Systems: Minimizing I/O for Recovery and Degraded Reads"; Proceedings of the 10$^{th}$ USENIX Conf. on File and Storage Technologies; 2012; 14 pages.

Yi et al.; "A Research on High Availability Mechanism of Virtual Machine Based on Ceph"; Proceedings of the Int'l Conf. on Software Engineering and Computer Science; 2013; p. 16-20.

Weatherspoon et al.; "Erasure Coding Vs. Replication: A Quantitative Comparison"; Int'l Workshop on Peer-to-Peer Systems; 2002; 11 pages.

"Fio"; http://freecode.com/project/fio; Slapshot Media; © 2015; accessed May 27, 2019; 6 pages.

Anderson et al.; "Hippodrome: running circles around storage administration"; USENIX Conf. on File and Storage Technologies; Jan. 2002; p. 175-188.

Behzad et al.; "Taming parallel I/O complexity with auto-tuning"; IEEE Proceedings of the Intl Conf. on High Performance Computing, Networking, Storage and Analysis; Nov. 2013; 12 pages.

Behzad et al.; "A framework for auto-tuning HDF5 applications"; Proceedings of the 22$^{nd}$ Int'l Symposium on High-performance parallel and distributed computing; Jun. 2013; p. 127-128.

Yin et al.; "An empirical study on configuration errors in commercial and open source systems"; Proceedings of the 23$^{rd}$ ACM Symposium on Operating Systems Principles; Oct. 2011; p. 159-172.

Huang et al.; "Multi-dimensional storage virtualization"; ACM SIGMETRICS/Performance Int'l Conf. on Measurement and Modeling of Computer Systems; 2004.

* cited by examiner

ADAPTIVE SOFTWARE-DEFINED STORAGE FOR CLOUD STORAGE WORKLOADS

BACKGROUND

The design of large-scale enterprise storage systems has traditionally relied on a detailed understanding of their workload characteristics to achieve both the desired performance (e.g., throughput or response time) as well as cost efficiency. Workload characteristics drive the storage design choices across the storage stack, ranging from low-level hardware decisions such as the ratio of storage/compute/network or type of storage medium (HDD, SSD), to higher level software choices such as tiering structure, cache sizes, or replication and parity schemes.

This disclosure is directed to solving one or more of the problems in the existing technology.

SUMMARY

The explosive growth of data due to the increasing adoption of cloud technologies in the enterprise has created a strong demand for more flexible, cost-effective, and scalable storage solutions. Many conventional storage systems, however, are not well matched to the workloads they service due to the difficulty of configuring the storage system optimally a priori with only approximate knowledge of the workload characteristics.

Disclosed herein is cloud-based orchestration that may be leveraged to create flexible storage solutions that use continuous adaptation to tailor themselves to their target application workloads that may provide efficiencies in performance, cost, or scalability over conventional designs. An exemplary storage technique disclosed herein (also referred to as SuperCell) may include a Ceph-based distributed storage mechanism with a recommendation engine for the storage configuration. SuperCell may provide storage operators with real-time techniques for reconfiguring the storage system to optimize its performance, cost, and efficiency, which may be based on statistical storage modeling and data analysis of the actual workload. The disclosed object storage daemon (OSD) model and media model may calculate expected SLA okay ratio for a given workload.

In an example, an apparatus may include a processor and a memory coupled with the processor that effectuates operations. The operations may include obtaining one or more metrics associated with a cloud storage network; determining that a first metric of the one or more metrics reached a first threshold; based on the first metric reaching the first threshold, determining one or more storage configuration candidates for reconfiguring the cloud storage network to operate within the first threshold; and reconfiguring a first device of the cloud storage network based on a first storage configuration candidate of the one or more storage configuration candidates. Metrics and SLAs, for example, may include throughput for read data, throughput for write data, bandwidth utilization for media type, or response time for requests (e.g., GET or READ), among other things.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Reference will now be made to the accompanying drawings, which are not necessarily drawn to scale.

DETAILED DESCRIPTION

Figure 1:
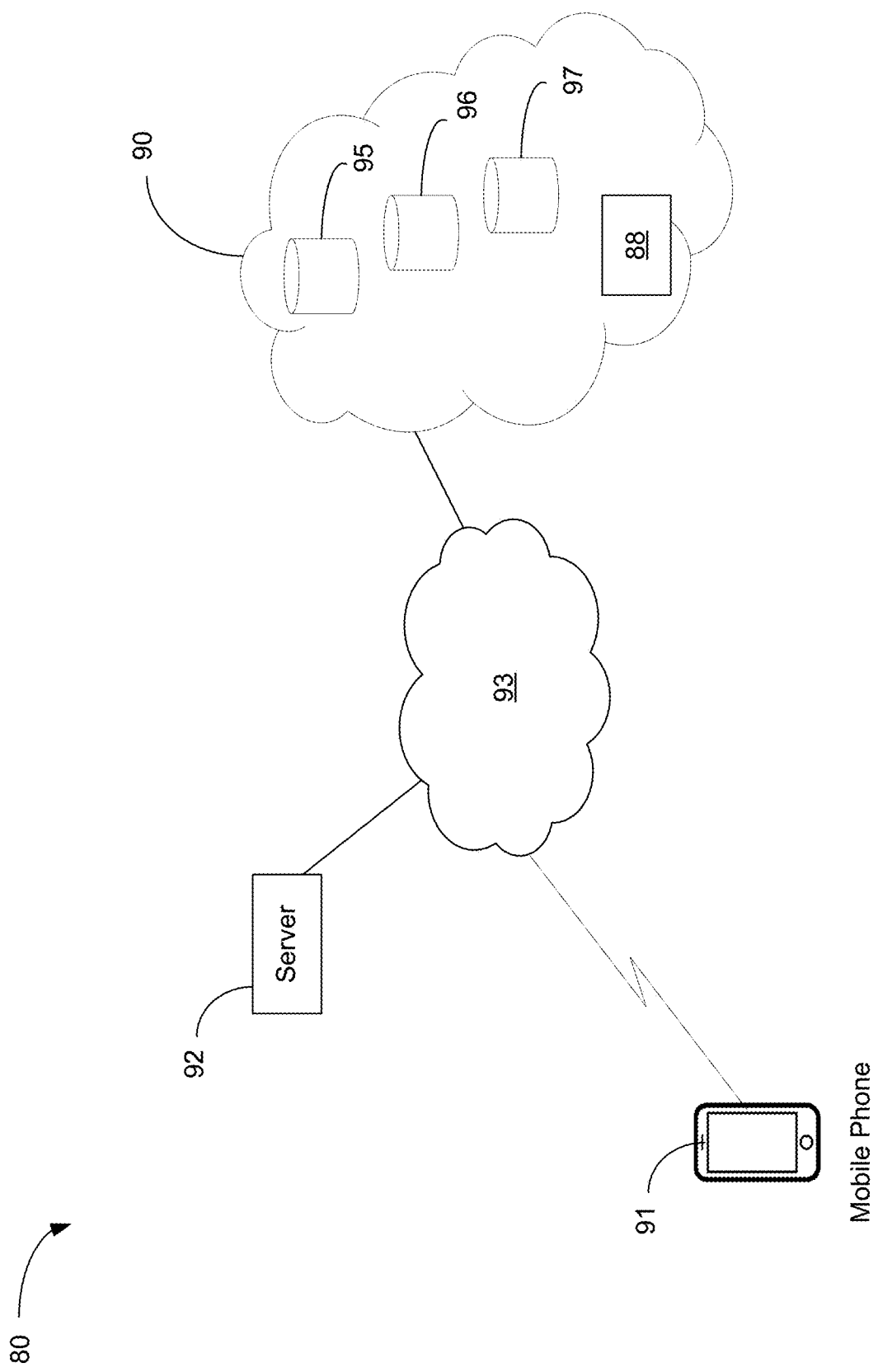
FIG. 1 is an exemplary system that may implement adaptive software-defined storage.

The design of large-scale enterprise storage systems has traditionally relied on a detailed understanding of their workload characteristics to achieve both the desired performance (e.g., throughput, response time) as well as cost efficiency. Workload characteristics drive the storage design choices across the storage stack, ranging from low-level hardware decisions such as the ratio of storage/compute/network or type of storage medium (HDD, SSD), to higher level software choices such as tiering structure, cache sizes, or replication and parity schemes.

However, storage architects are often confronted by the fact that an application's knowledge of its workload characteristics and requirements may be very poor, or actually incorrect, during the initial design stage. Once a storage system has been architected, built, and deployed, it becomes difficult or expensive to change, even if the application owner discovers previously unforeseen workload characteristics, the requirements change, or the storage system evolves to use new features, such as de-duplication and encryption, that could benefit from changes to the storage system's design. Disclosed herein are methods, systems, and apparatuses that address this dilemma through a software-defined virtualized storage system (e.g., called SuperCell) where design and configuration is not exclusively an up-front activity, but rather, a measurement-driven process (e.g., continuous measurement or periodic measurement) that may occur throughout a lifetime of a system. This allows an application deployed with SuperCell to be initially provided with a generic storage configuration that requires only basic requirements such as storage size, availability, desired throughput, and response time. Post deployment, SuperCell may measure workload characteristics such as request size distribution, read/write intensities, and working set size to estimate how the initial storage configuration can be tailored to meet a user's requirements better in a cost-effective manner. In an example, list of possible reconfiguration choices with cost/benefit analysis may be presented to a storage system administrator. In another example, based on pre-determined thresholds the system may automatically decide whether to act on any of the recommendations or not. Any subsequent changes in the workload or the requirements may trigger a similar process. Request size distribution may be considered the distribution of the size of the requested io. For instance, there are 1000 io requests, out of which 100 is of size smaller or equal to 1 KB; 200 is between (1 KB, 16 KB), 200 is between (16 KB, 24 KB) etc. Read/write intensities may be considered the intensity of read/write requests. For instance, workload A has a read intensity of 20 MB/s and a write intensity of 60 MB/s. Working set size may be considered bytes read/write in a workload. A working set A may have 2500 bytes read and 5000 bytes written.

SuperCell may use Infrastructure as a Service (IaaS) clouds as an enabler. Rather than building the storage system on bare-metal (e.g., a storage system is deployed on native machines (hardware) directly) and providing a virtualization layer above it, SuperCell may deploy a separate, individually customizable, storage system for each application using virtual machines and virtualized raw block storage on an IaaS cloud. Doing so enables SuperCell to utilize several run-time choices such as dynamically adding or removing shards to adjust the level of concurrency, using media with different performance characteristics (HDD, SSD) for different parts (main storage, journal, cache) of the storage system, or changing the erasure coding scheme to best serve the measured traffic characteristics.

Disclosed herein is development of a set of lightweight models that may predict the cost and performance impact of adopting these various design choices to allow SuperCell to make intelligent adaptation recommendations. Normally, the construction of accurate yet tractable queuing models that can predict percentile-based performance metrics is a challenging task. However, the problem may be simplified, as disclosed herein, by leveraging the unique runtime nature of SuperCell. Because SuperCell can measure derivative metrics, such as media bandwidth and utilization, directly, it can short-circuit a full queuing theory treatment and directly construct simpler regression models that are still accurate enough to make comparative decisions between different adaptation options.

As disclosed herein, for an example scenario, a prototype of SuperCell using the Ceph distributed object storage system that can run on public (e.g., Amazon Web Services (AWS)) or private (e.g., OpenStack) clouds. Ceph provides several characteristics that allow for continuous adaptation, including configuration flexibility, support for various redundancy levels through replication or erasure coding, and the ability to rebalance after any significant changes to storage nodes. As described in more detail below, SuperCell instance deployed on the public cloud is evaluated against a variety of workloads synthesized from actual production traces of a large-scale object storage system deployed in a commercial service provider. Using these workloads, it was shown that SuperCell can choose configurations that reduce the storage cost significantly by up to 48%, while meeting stringent performance SLAs based on 99th percentile response time.

SuperCell's architecture may provide a combination of support for various storage types, scalability/elasticity, and flexible redundancy options, which is unlike conventional systems. Described below is 1) exemplary storage issues and target scope for addressing those issues; 2) exemplary storage configuration model and architecture of SuperCell; and 3) exemplary experimental methodology and results with a prototype of SuperCell, among other things.

A multi-tenant cloud storage environment has unique characteristics that set it apart from traditional storage systems. A multi-tenant cloud storage environment may be more challenging to manage since the Service Level Agreements (SLA) and the associated cost of cloud storage service of each tenant can vary widely based on its workload. Moreover, capacity and performance requirements may increase or decrease gradually, or change suddenly due to seasonal demands or unexpected interest in certain content (flash crowds). As a result, cloud storage systems should be elastic and adapt to changing workloads as needed. As an attempt to achieve such flexibility, software-defined storage (SDS) technologies are often used. SDS is typically composed of commodity servers and storage devices with a scale-out architecture. Also, since large-scale servers and devices experience errors and faults regularly, erasure codes are commonly used to improve robustness and availability. The adaptive software defined storage (SDS) for cloud storage workloads, as disclosed herein may be used to dynamically adapt to a changing workload. In addition, the disclosed adaptive SDS may assist in informing the cost and benefit of each reconfiguration option.

Ceph is an open-source distributed storage system that may be based on the Reliable Autonomic Distributed Object Store. Ceph is widely used in private clouds (e.g., OpenStack-based) and it provides three interfaces: object storage, block storage, and file system. A significant feature of Ceph is its massive scalability due to a completely distributed system design with no centralized meta-server. To do this, Ceph may use a Controlled Replication Under Scalable Hashing (CRUSH) map to determine which servers have replicated copies of an object, and provides automatic rebalancing among servers when the number of servers changes or when some servers fail.

Ceph may control object distribution on different levels and provide various levels of redundancy (e.g., replication and erasure coding). Ceph also may allow the construction of different storage pools with a mix of different types of storage media such as hard drives or SSDs. These features make it a natural choice to construct scalable, flexible, distributed cloud storage systems.

Figure 2A:
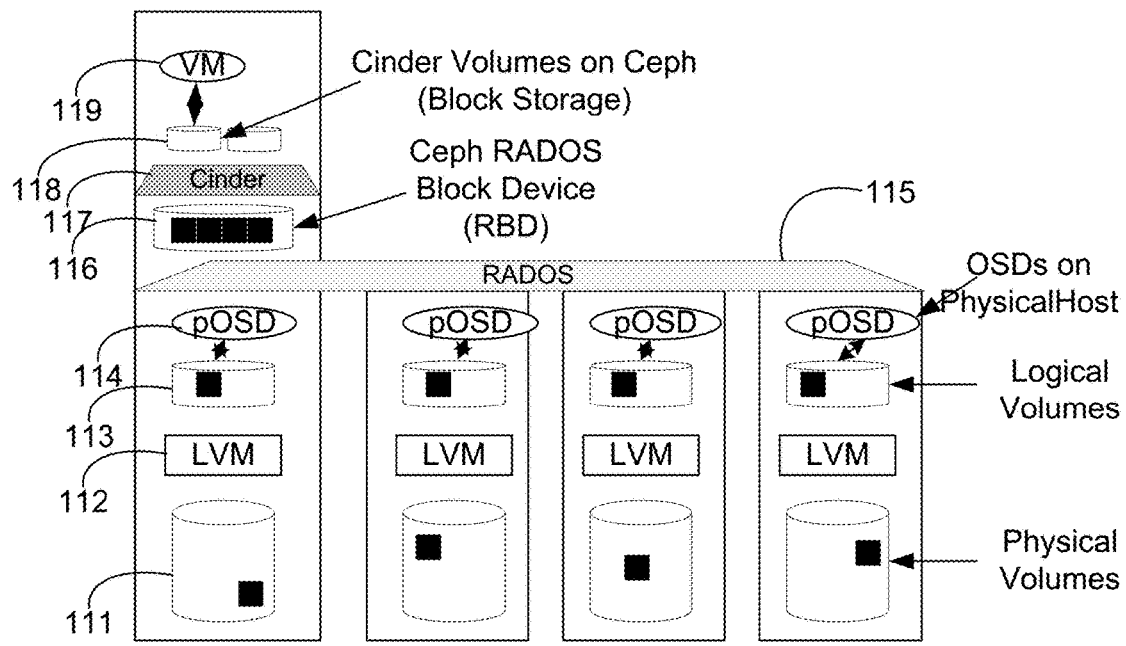
FIG. 2A is an exemplary illustration of an OpenStack Cinder on Ceph that provides block storage in a standard usage.
Figure 2B:
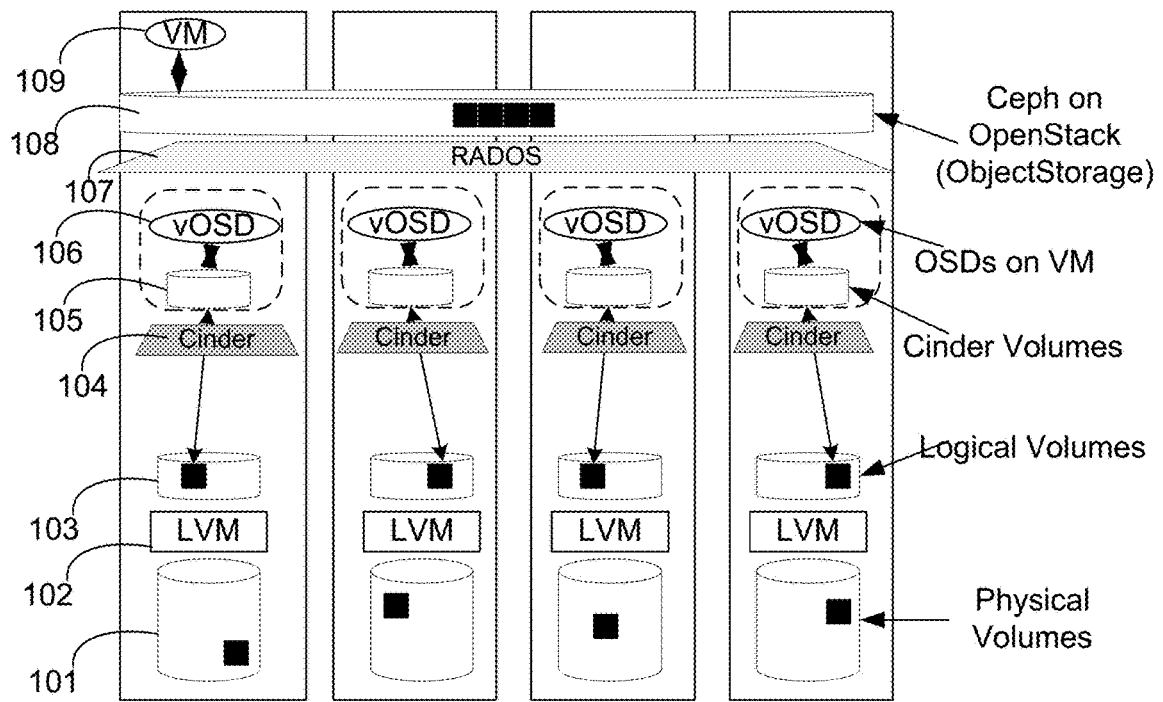
FIG. 2B is an exemplary illustration of a Ceph object storage built on top of OpenStack Cinder volumes as used in SuperCell.

SuperCell may use Ceph (or the like) deployed on top of a virtualized cloud environment, such as OpenStack, as its underlying storage system. While incurring virtualization overhead, this approach may have advantages that include the ability to meet different storage QoS requirements for different tenants, efficient resource usage, and rapid and flexible deployment. FIG. 2A is an exemplary illustration of an OpenStack Cinder on Ceph that provides block storage in a conventional usage. FIG. 2B is an exemplary illustration of a Ceph object storage built on top of OpenStack Cinder volumes as used in SuperCell. FIG. 2A may include physical volumes 111 on native hosts, logical volumes service 112, logical volumes 113, OSD 114 with LVM backend on native hosts, Ceph RADOS gateway 115, Ceph RADOS block device 116 (e.g., created upon the Ceph pool underlying with RADOS gateways), Cinder volume 117, block storage volumes 118 created by Cinder from RADOS block device, or virtual machine client 119, as shown. While, FIG. 2B may include physical volume 101, logical volume service 102 (to virtual a physical volume), logical volumes 103, OpenStack Cinder service 104 (e.g., handling persistence storage for VMs), Cinder volume 105 (e.g., volume created from logical volume groups through Cinder), object storage daemon (OSD) 106 on virtual machines (VOSD), Ceph RADOS gateway 107, Ceph object storage 108, or virtual machine client 109, as shown.

As can be seen in FIG. 2A and FIG. 2B are configured differently. For example, in FIG. 2A, OSDs 114 are on physical hosts directly and logical volumes 113 are attached to OSDs directly. While in FIG. 2B, OSDs 106 may be on VMs (instead of on hosts), and Cinder volumes 105 may be created from logical volume groups and attached to OSDs 106 (on VMs) through Cinder. In another example, FIG. 2A may create a Ceph cluster on native hosts and a Ceph RBD (Rados Block Device) 116 may be created out of this Ceph cluster and attached to VM 119 through Cinder 118. While FIG. 1B may have a Ceph cluster where each OSD 106 may have a Cinder backend 104. Once deployed, the architecture of FIG. 2B components in this Ceph cluster may be in virtualized environment and components can be controlled using an Openstack, or the like, layer. Table I compares other characteristics of FIG. 2A and FIG. 2B.

TABLE I

|  | (a) Cinder on Ceph | (b) Ceph on Open Stack |
|---|---|---|
| Main storage API | Block storage | Object storage |
| Rapid deployment | No | ✓(VM) |
| Different configs. for different QoS requirements | Difficult | ✓(Controllable in the OpenStack layer) |
| Low virtualization overhead | ✓(OSDs on native hosts) | VM overheads |
| Flexible resource usage | No | (OSDs on VM's) |

SuperCell may provide different adaptive configurations of a storage system to enable run-time adaptation of storage systems by analyzing actual workloads or their costs. Table II shows exemplary parameters (e.g., workload or performance) monitored by SuperCell and the associated exemplary monitoring techniques. SuperCell may be implemented in a common cloud platform with compute and storage, such as a private cloud set up with OpenStack or a public cloud such as AWS. Workload or performance may include monitor parameters in Table II. Examples of the parameters in Table II are disclosed below. Request size distribution may be considered the distribution of the size of the requested io. For instance, there are 1000 io requests, out of which 100 is of size smaller or equal to 1 KB; 200 is between (1 KB, 16 KB), 200 is between (16 KB, 24 KB) etc. Working set size may include bytes read/write in a workload. A working set A may have 2500 bytes read and 5000 bytes written. Cache hit ratio, for example, may be out of a total of 10000 IOs, if 5000 actually hit the cache (is written or read from cache), then it's considered to have a cache hit ratio of 5000/10000=50%. Percentile Throughput may be considered the required throughput of a workload if it would like to meet the SLA standard for 99.9% of its requests (e.g., it requires a 50 MB/s for workload A to keep a SLA OK ratio at 99.9%). IO busy ratio may be considered the percentage of time that CPU is considered as busy for read/write IOs.

TABLE II

PARAMETERS MONITORED BY SUPERCELL

| Monitor parameters | Monitoring technique |
|---|---|
| Request size distribution | Statistics based on the workload trace |
| Working set size | Collect reads & writes through iostat |
| Cache hit ratio | Cache hit emulator |
| Percentile throughput | Calculate required throughput considering SLA |
| IO busy ratio | Collect CPU usage(iowait) by iostat |

Based on Service Level Agreements (SLAs), SuperCell may make recommendations to adapt to dynamic workloads and reconfigure the storage system to meet these SLAs. Table III shows exemplary storage requirements that may be used as inputs in SuperCell. Availability may be considered the percentage of time when the data is available at where it's stored. E.g., client has a requirement of 99.9% availability for a storage service. With regard to redundancy, in order to have a high availability, data is typically replicated and stored at multiple places (storage nodes). Other than the original copy, the other copies may be considered as redundant copies. A redundancy of 3 means there are 3 more copies stored at 3 other nodes, other than the original copy.

TABLE III

SUPERCELL INPUT: STORAGE REQUIREMENTS

| Input Requirement | Notation |
|---|---|
| Effective Capacity | C (in TB) |
| Availability/Redundancy | Up to N server failures |
| Average Throughput | B (in Mbps) |
| SLA Standard | e.g. Equation (1) |
| Required SLA percentile | e.g. 99% of Requests |

The SLA specifies the desired response time as a function of the object size. For example, Equation (1) defines an SLA for the response time Ress of each request as a function of the object size Sizes request i:

$$\begin{cases} Res_i < 1 \; sec & (Size_i < 1 \; MB) \\ Res_i < \dfrac{Size_i}{1 \; MB} sec & (Size_i < 1 \; MB) \end{cases} \quad (1)$$

The above example of an SLA specifies that if the request size is smaller than 1 MB, then the response time should be at most 1 second, while if the request size is larger than or equal to 1 MB, then the required response time is proportional to the request size, such as 2 seconds for 2 MB requests, 4 seconds for 4 MB requests, etc. SuperCell users can specify its own SLA standard. The measured percentile of requests that meet the requirements may be called the "SLA OK" ratio. Given the burstiness of the storage workload, it is typically not possible for every storage request to satisfy the SLA; therefore, users also should specify the required SLA OK ratio. To clarify, "request" may be a storage IO (input/output) operation. A request of size 4 MB means there will be a 4 MB read/write operation to the storage system.

FIG. 1 illustrates an exemplary system that may implement adaptive SDS for cloud storage workloads, as disclosed herein. System 80 includes mobile device 91, server 92, communications network 93, and cloud storage network 90. Mobile device 91, server 92, communications network 93, and storage network 90 may be communicatively connected with each other. Cloud storage network 90 may include multiple OSDs (e.g., OSD 95, OSD 96, or OSD 97) and a monitoring service 88. Monitoring service 88 may monitor the workload of particular physical devices, virtual machines, or the like, within storage network 90. Monitoring service 88 may be a logical entity that resides on one or more devices within system 80. Each physical or virtual device in system 80 may be communicatively connected with each other. Server 92 or monitoring service 88 may be used to obtain or receive alerts associated with performance of cloud storage network 90.

Figure 3:
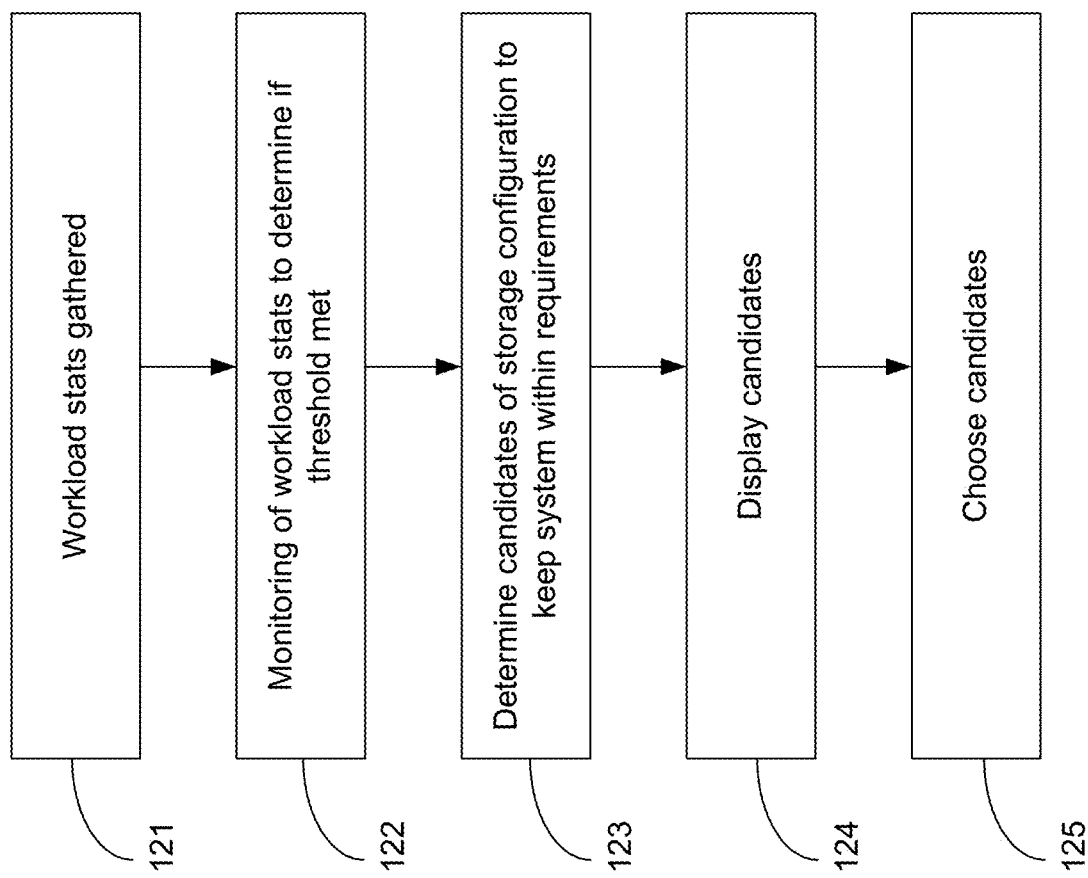
FIG. 3 illustrates an exemplary storage reconfiguration process with SuperCell.

FIG. 3 illustrates an exemplary storage reconfiguration process with SuperCell. At step 121, workload information may be gathered by monitoring service 88. The workload information may be from different entities with cloud storage network 90, such as OSD 95 or OSD 96. At step 122, the workload information of step 121, which may be received in near-real time, may be monitored to determine whether the workload information has reached a threshold. The workload threshold may include any of the parameters (which may include input requirements) of Table II, Table III, or Table IV, etc. For example, a first threshold of parameters may be 99% of requests for a service during a 3 minute period should be processed by virtual machine within 1 second.

At step 123, if it is discovered that the workload information (which may be near real-time) is greater than the first threshold, then it should trigger a determination of one or more storage configuration candidates to keep system (e.g., OSDs of cloud storage network 90) within the first threshold. Storage configuration candidates (e.g., see Table VII and disclosed in more detail below) may be based on real-time simulations or historical improvements, among other things. Historical improvements may include, as disclosed, may be the use of configurations that led to improved results (e.g., returning within a threshold) in the same or substantially similar network design or workload. Storage configuration candidates may be narrowed to a top three list based on one or more factors, such as estimated least amount of time for returning a system to be within the first threshold, the least cost within a minimally acceptable time for returning a system to be within the first threshold, most often chosen by an administrator user during a period, or the like. Different models, as disclosed herein, may be used to determine the storage configuration candidates.

With continued reference to FIG. 3, at step 124 the storage configuration candidates may be displayed (e.g., Table VII). At step 125, a storage configuration candidate is chosen to be implemented. In an example, a user may choose from the displayed list of storage configuration candidates. In another example, a user may be given a set time (e.g., 20 seconds) before one of the storage configuration candidates is automatically chosen. The automatic choice may be random or based on any of the parameters disclosed herein. In another example, as with many of these steps, step 124 may be skipped and the computing device may automatically chose a storage configuration based on the parameters disclosed herein. Disclosed below are additional examples that are associated with the steps of FIG. 3. Although examples mention the reconfiguration of storage, it is contemplated herein that certain other network elements (e.g., network interfaces, network communication line speeds, load balancing, etc.) may be reconfigured.

In an example, SuperCell monitors I/O and response time of each request. If the estimated SLA ratio differs from the monitored actual SLA ratio, SuperCell chooses candidate storage configurations that would meet SLA requirements, and displays these candidates with estimated SLA ratio, costs, and transition duration to the storage administrator (e.g., Table VII). In an example, administrator then chooses one configuration from candidates, and reconfigures the actual storage system.

With reference to step 123 of FIG. 3, determining which Ceph configuration can support a given workload may be based on a first model (a)—the workload that an SSD and HDD based storage device can support or a second model (b)—how the offered workload at the Ceph level translates to offered workload for the storage volumes given different configurations of Ceph. The first model may be called the storage media model and the second model may be called the Ceph object storage daemon (OSD) model. Note that standard reliability models may be used to determine the level of redundancy (replication level or erasure code strength) required to achieve the desired availability. In general, using an erasure-code (EC) scheme saves storage space, while using a triple-replication (×3 Repl) scheme offers better performance.

The storage media model may be affected by the storage access pattern and request sizes. Therefore, the throughput of each storage media type may be quantified as a function of the read/write request size and request ratio. The storage media model may be determined empirically by performing micro-benchmarks on the different available storage devices. Note it may be assumed that the throughput of each storage media is not affected by other tenants or services using the same storage device. Both models for the experiment were created by using fio-based micro benchmarks (e.g., http://freecode.com/projects/fio) on Ceph.

The Ceph OSD model may depend not only on the number of OSDs or the type of redundancy scheme used, but may also depend on the read-write ratio, cache hit rate, or the requested object size, as described in more detail herein. In the case of the triple-redundancy scheme (default), the primary OSD, which receives a write request from a client, may write the received data to its journal to reduce latency. At the same time, the primary OSD may deliver copies of the data to two other (replica) OSDs, which also write the received data to their journals first. Once the journal write is completed, the two replica OSDs send a response to the primary OSD, which may return a completion message to the client after all three acknowledgments of journal writes are gathered. Meanwhile, the primary and replica OSDs write the data to their respective storage volumes in parallel. Because each OSD may write data twice (in its journal and data volume), and the primary OSD sends it to two other OSDs, the data may be written six times, but on separate storage volumes in the triple replication case.

The amount of data written and the number of individual write requests depend on the object size. First, if an object is very small, the total amount of I/O generated by Ceph is slightly larger than the object size. In the case of erasure-coded (EC) storage, if the object size is smaller than the chunk size, padding bytes are added into each chunk. Furthermore, Ceph OSDs break up larger objects into smaller blocks for storage. In the erasure-coded case (with k data chunks and m parity chunks), as a primary Ceph OSD may divide and encode each object into k+m chunks and distribute them to multiple OSDs, the average IO size is typically smaller compared to the replicated case.

The read-write ratio determines how much of the workload is distributed between read and write operations. The cache hit rate determines what percentage of the object read operations actually generates a read request to the storage media.

Figure 4:
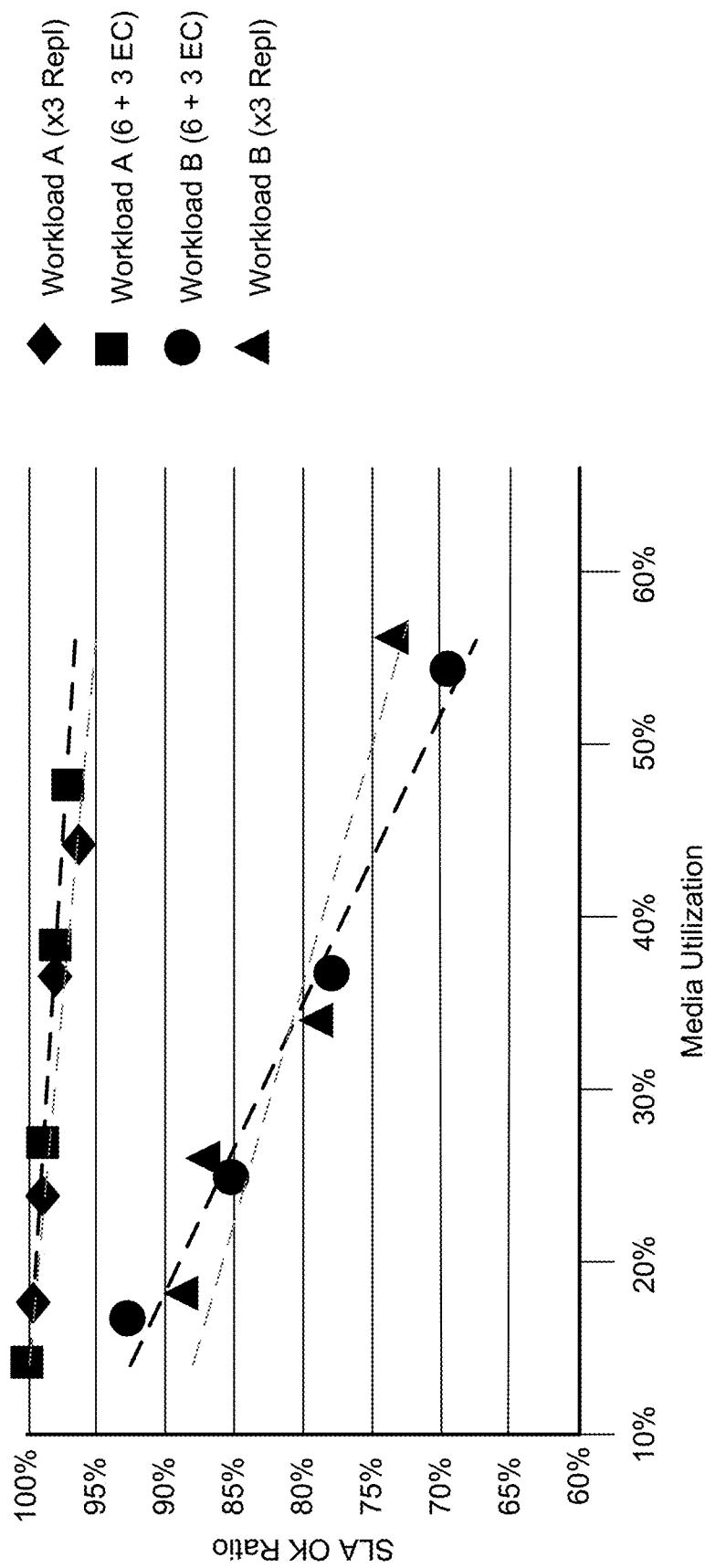
FIG. 4 illustrates an exemplary the average media utilization of each OSD was calculated into the SLA ratio.

To reflect the degradation of storage response time as the media fills up, we can estimate the SLA ratio with the maximum media utilization (e.g., the percentage of media that is consumed by data) via the utilization—SLA model. In an experiment, two sets of workloads (with 1 process, 16 threads) on a Ceph testbed of 9 OSDs, and the average media utilization of each OSD was gradually increased from 15% to 56%, and then the average media utilization of each OSD was calculated into the SLA ratio, which is shown in FIG. 4. From FIG. 4 a strong relationship can be seen between media utilization and the SLA OK ratio, but the slope of the line in FIG. 4 varies according to the given workload (degrees of congestion and variations). While it is difficult to estimate the accurate SLA ratio in advance, an appropriate model could be built by continuous monitoring of different configurations. In the case of workload A, it is necessary to keep the media utilization under 40% if the required SLA OK ratio is more than 95%. Therefore, with more intense workloads, we may need more OSDs to maintain the desired performance and SLA by keeping the average media utilization of each OSD below a certain level. Equation (3) and Equation (4), among others, help explain what is provided in FIG. 4. "Degrees of congestion and variations" may be considered the slope of the dashed line for workload A and workload B are different, in addition, the degree that the data points that is "off" the dashed line is also different. The slope shows how fast the SLA ok ratio changes with media utilization, the degree of this slope can be directly observed from FIG. 4.

With reference to step 121 and step 122 of FIG. 3, for example, Table IV defines a set of parameters and functions that may be used to describe the equation to calculate the utilization of each media from a given workload and our models.

Figure 5:
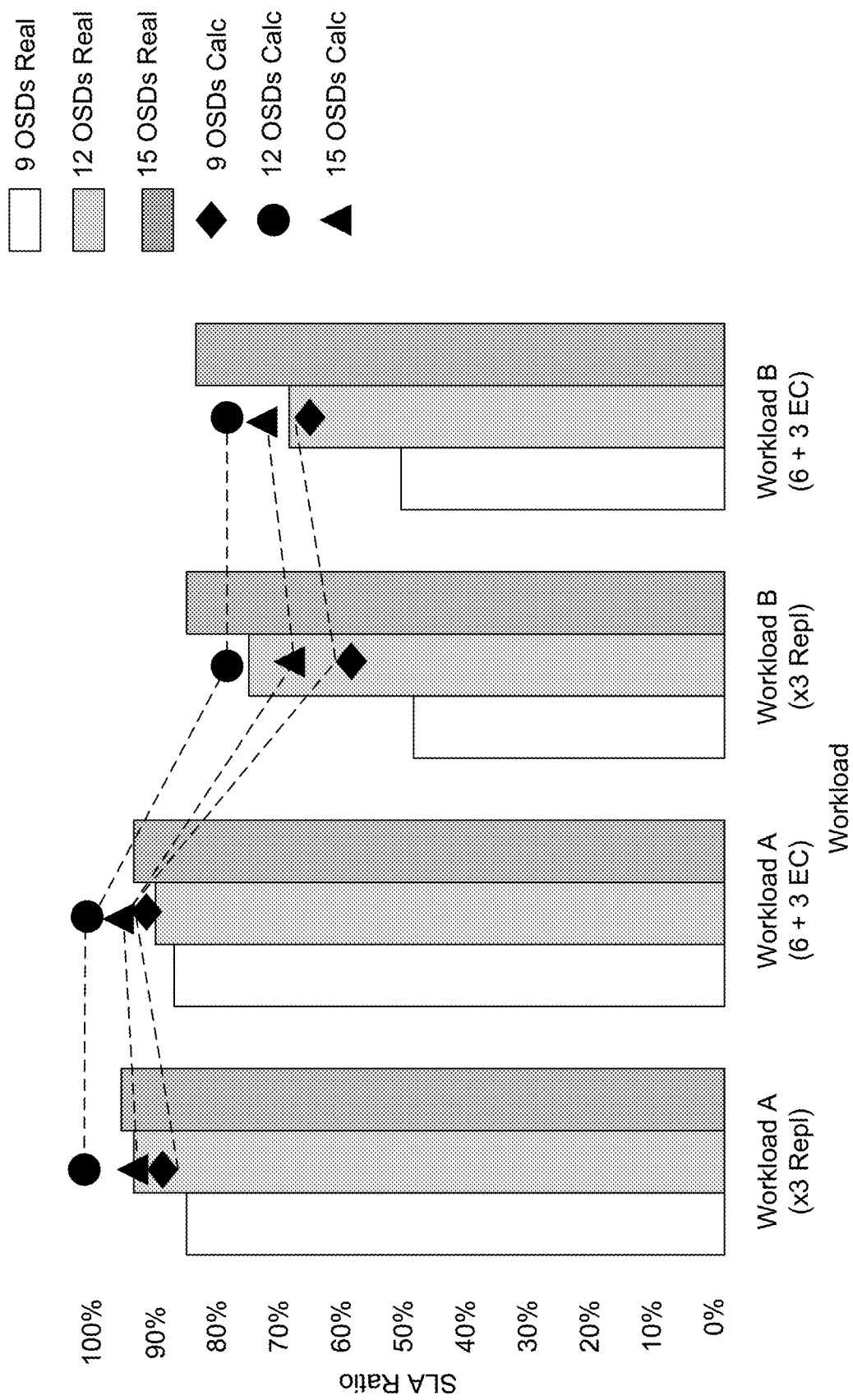
FIG. 5. Ceph OSD model which maps the expected SLA OK ratio to the number of OSDs needed, verified by real SLA OK ratio in implementation.

Based on the relationship between media utilization and SLA ratio, the number of OSDs for each type of workload may be calculated. With a given SLA (e.g., required SLA ratio), the IOAmount requirement may be mapped to the average OSD media utilization MU or per-OSD bandwidth utilization BU. Then, with the total workload WL (expressed in R/W bandwidths), the number of OSDs needed may be calculated as N=WL/BU. To verify this, the SLA ratio for the workload may be calculated based on the results shown in FIG. 4, for Ceph pools with different number of OSDs (from 9 OSDs to 15 OSDs). Experiments were run to measure the real SLA ratio for these pools and compare the results with our calculation. FIG. 5 shows the accuracy of the Ceph OSD model between the number of OSDs needed and SLA ratio. FIG. 5 Ceph OSD model which maps the expected SLA OK ratio to the number of OSDs needed, verified by real SLA OK ratio in implementation. The SLA OK ratio mentioned earlier is either what we defined in Equation (1), or calculated as in FIG. 3. Here the "real" SLA OK ratio the monitored workload as it runs in real time and counting the number of requests that actually meet the SLA standard and observe the SLA OK ratio.

Figure 6:
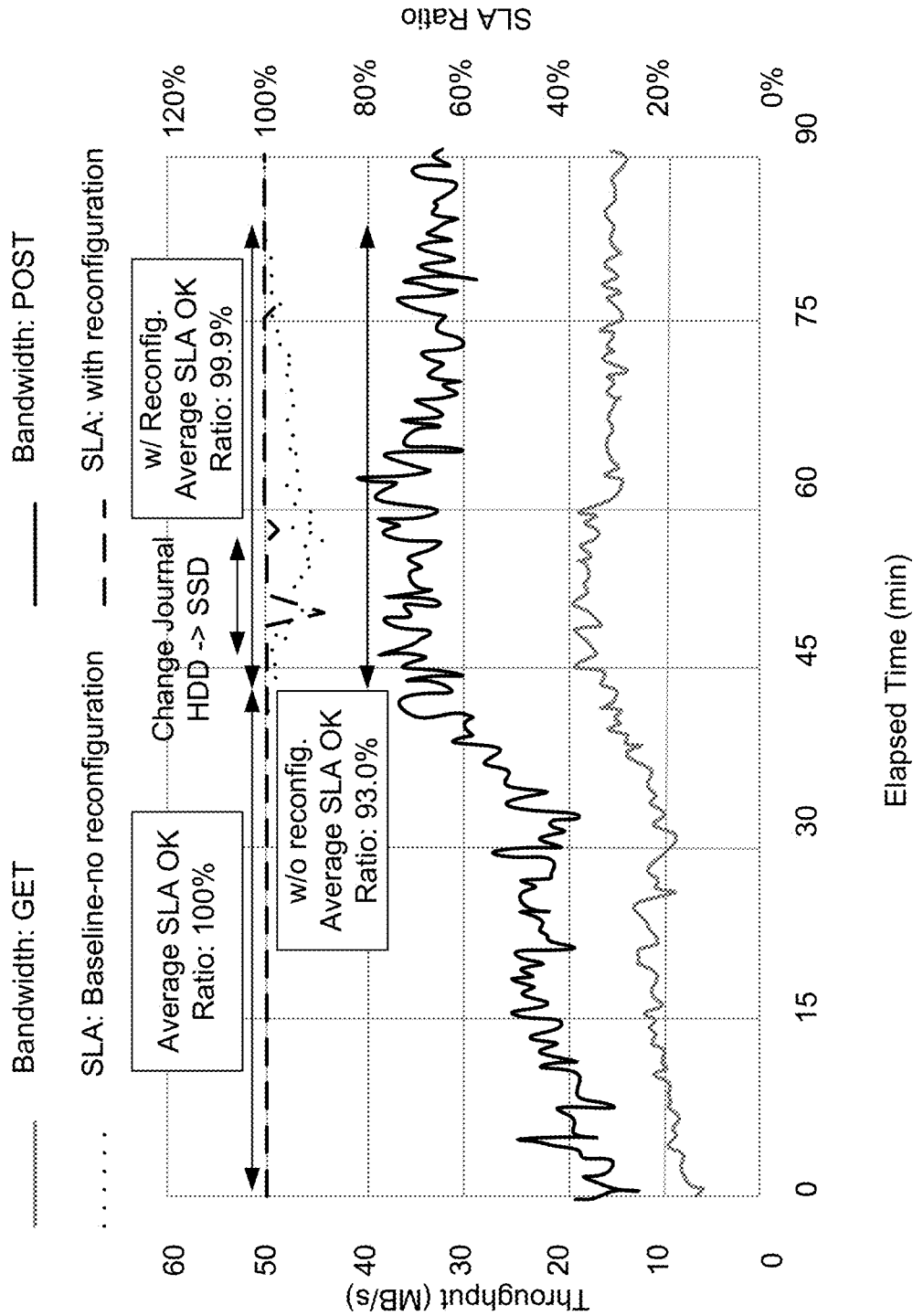
FIG. 6 illustrates. SLA OK ratio transition with original configuration.

Client-issued system throughput may be calculated by a given workload WL and the required throughput percentile PERC (e.g., threshold) as shown in equation (2). An example of the throughput percentile in a given workload is shown in FIG. 6 with more detailed explanation later on. If the throughput T meets "required percentile=90%", then 90% of transactions included in the given workload could meet the SLA requirement with throughput T. FIG. 3 illustrates a graph for storage media model which maps media utilization level to expected SLA OK ratio with different workload characteristics. Workload A: expected throughput: 25 MB/s Read, 50 MB/s Write, Required percentile=99%; Workload B: 50 MB/s Read, 100 MB/s Write, Required percentile=80%.

$$\begin{cases} r_p = Percentile_r(WL, PERC) \\ w_p = Percentile_w(WL, PERC) \end{cases} \quad (2)$$

Once the client-issued throughput $r_p$ and $w_p$ are calculated, then required system throughput r, w, j are calculated via the Ceph model with consideration for cache hits as shown in equation (3). Each throughput of read, write, and journal is adjusted by Ceph's I/O patterns based on the replication factor and defined by IOAmount with request size distribution SD and encoding method (k, m). Read throughput is reduced by the cache-hit effects decided by the given workload WL and memory size MS. Write and journal throughput are magnified by (k+m)/k because of Ceph OSD's write behavior that sends replicated or erasure-coded chunks to other OSDs. FIG. 6 provides an example graph for SLA OK ratio transition with original configuration. Required workload throughput has a significant increase at $42^{nd}$ minute, which caused the SLA ratio to drop. SuperCell provides possible reconfiguration options to recover the SLA ratio, out of which changing journals from HDD to SSD is recommended as it would have the most significant effect in recovering the SLA with the minimal recovery time and cost. SuperCell executes reconfiguration on the $45^{th}$ minute and the SLA comes back to 99.9% on average since the $51^{st}$ minute. The selected reconfiguration provides minimal recovery time compared to other possibilities. Change from erasure code to triple replication requires Ceph to reset the pool's ruleset, which may require a complete rebalance among all the placement groups in this pool and take a lot of recovery time. Add 3 OSDs will also trigger rebalance among all OSDs in current pool, which may be time consuming. With regard to this example, the write intensive workload is causing the SLA okay ratio to drop. And Ceph journal is serving write requests, thus changing journals from HDD to SSD should be the most effective way to improve write performance. In addition, it does not require data re-balance across the placement groups but only needs to pause the OSD and flush the journal.

TABLE IV

DEFINITION OF PARAMETERS AND FUNCTIONS

| variable/function | meanings |
| --- | --- |
| r | Required system throughput for read data |
| w | Required system throughput for write data |
| j | Required system throughput for write journal |
| $N_x$ | Total number of media x in the system |
| $R_x$ | Bandwidth of each media x for read data |
| $W_x$ | Bandwidth of each media x for write data |
| $J_x$ | Bandwidth of each media x for write journal |
| $BU_x$ | Bandwidth utilization of each media x |
| $MU_x$ | Media utilization of each media x |
| $r_p$ | Client issued system throughput with required percentile for read |
| $w_p$ | Client issued system throughput with required percentile for write |
| $SD_{r,w}$ | Request size distribution vector for read and write |
| k | Number of data chunks |
| m | Number of parity chunks |
| WL | Workload consists of a sequence of read or write requests |
| MS | Memory size of hosts where Ceph OSDs are on |
| CH (WL, MS) | Cache hit ratio calculated by the given workload WL |

TABLE IV-continued

DEFINITION OF PARAMETERS AND FUNCTIONS

| variable/function | meanings |
|---|---|
| PERC | Required throughput percentile to meet the SLA OK ratio |
| IOAmount$_{r,w,j}$ (SD, k, m) | Function returns IO amount ratio by Ceph for read, write, journal, with given size distribution SD and encoding (k, m) |
| IOSize$_{r,w,j}$ (SD, k, m) | Function returns IO size divided by Ceph for read, write, journal, with given size distribution SD and encoding (k, m) |
| MediaBW$_{r,w}$ (S) | Function returns media bandwidth for read, write, for given IO size S |
| Percentile$_{r,w}$ (WL, PERC) | Function returns required throughput percentile for read and write, with given workload WL and required SLA percentile PERC |
| SLA (BU, MU, WL, k, m) | Function returns estimated SLA OK ratio with given bandwidth utilization BU, media utilization MU, workload characteristics WL, and encoding (k, m) (FIG. 4) |

$$\begin{cases} r = r_p \times IOAmount_r(SD_r, k, m)) \times (1 - CH(WL, MS)) \\ w = w_p \times \frac{k+m}{k} \times IOAmount_w(SD_w, k, m) \\ j = w_p \times \frac{k+m}{k} \times IOAmount_j(SD_w, k, m) \end{cases} \quad (3)$$

On the other hand, each media's maximum bandwidth may be calculated by the media characteristics model MediaBW, and Ceph's I/O sizes for reads, writes, and journals, determined by IOSize, are described in equation (4). Both IOSize and IOAmount depend on the size distribution SD and encoding (k, m).

$$\begin{cases} R = MediaBW_r(IOSize_r(SD_r, k, m)) \\ W = MediaBW_w(IOSize_w(SD_w, k, m)) \\ J = MediaBW_w(IOSize_j(SD_w, k, m)) \end{cases} \quad (4)$$

At this time, the bandwidth utilization for each media BU may be calculated by the system throughputs of read, write, journal: r, w, j, total number of media devices N, and the maximum bandwidth of each media device for read, write, journal, R, W, J.

In the case of using the same media d for both data and journal, the bandwidth utilization BU$_d$ is calculated using equation (5).

$$\left\{ BU_d = \frac{r/N_d}{R_d} + \frac{w/N_d}{W_d} + \frac{j/N_d}{J_d} \text{ (for both)} \right. \quad (5)$$

On the other hand, in the case of the different media d for data and s for journal, the bandwidth utilization BU$_d$ and BU$_s$ are calculated by equation (6).

$$\begin{cases} BU_d = \frac{r/N_d}{R_d} + \frac{w/N_d}{W_d} \text{ (for data)} \\ BU_s = \frac{j/N_s}{J_s} \text{ (for journal)} \end{cases} \quad (6)$$

Then the SLA function is applied with arguments of maximum bandwidth utilization for each media, the projected media utilization for each media MU, the workload WL, and encoding (k, m) as shown in equation (7).

$$SLAratio = SLA(\max(BU_x), MU, WL, k, m) \quad (7)$$

Some experiments were conducted on public Ceph distributed storage (e.g., AWS) EC2 with a scaled-down cloud object storage workload that has the following characteristics: 1) Writes (POST) are full writes, while reads (GET) are partial reads; 2) The number of reads is greater than the number of writes, and the average size of writes is larger than the average size of read; and 3) The required throughput of writes is almost twice that of reads. These characteristics match workloads associated with online archival storage, among other types of systems. Table V public Ceph distributed storage pricing and Table VI gives the specifications of the hardware and software used in the experiments.

TABLE V

EXAMPLE PUBLIC PRICING FOR CEPH COMPONENTS

| target | flavor | price |
|---|---|---|
| OSD instance | m4.xlarge | 0.2 $/Hour |
| monitor instance | t2.micro | 0.0116 $/Hour |
| HDD Storage (OSD data) | EBS[1] | 0.045 $/GB per Month |
| SSD storage (optional OSD journal) | EBS[2] | 0.10 $/GB per Month |

[1]Throughput Optimized HDD (st1) provisioned storage. Assume "reduced redundancy" storage, because Ceph guarantees redundancy.
[2]General Purpose SSD (gp2) provisioned storage.

TABLE VI

CONFIGURATION SPECIFICATIONS FOR SUPERCELL ON PUBLIC EC2

| Parameters | Values |
|---|---|
| # of VMs | m3.xlarge × 4 |
| | t2.micro × 1 |
| CPU | Intel Xeon E5-2670 2.6 GHz |
| vCPU/m3.xlarge | 4 |
| vCPU/t2.micro | 1 |
| Memory/m3.xlarge | 15 GB |
| Memory/t2.micro | 1 GB |
| Storage/m3.xlarge | 500 GB Throughput Optimized HDD ×4 |
| | 23 GB General Purpose SSD |
| Ceph | ×1 |
| | 10.2.5 (Jewel) |

A first experiment demonstrated how SuperCell may do adaptive reconfiguration of the storage system based on monitoring. As disclosed before, SuperCell may periodically check performance-related values (e.g. step 122). Based on the performance-related values reaching a threshold, it may provide a reconfiguration plan (e.g., step 123). One way to monitor whether the SLA is being met is to evaluate the response time of the storage system directly. In an example, there may be sampling of transactions that do not disturb production workloads can be used to evaluate the response times periodically. In another example, the workload generator may measure each transaction's response time directly and then evaluate the SLA OK counts from those results.

FIG. 6 shows the results of the SLA OK ratio transition and the required throughput. In this first experiment, the required throughput increases in the middle of the workload due to an increase in offered load (POST increases from 20

MB/s to 35 MB/s, GET increases from 10 MB/s to 16 MB/s on average), which prevents the system from satisfying the 99% percentile SLA.

Based on the monitoring results (e.g., step 123), there may be recalculation of media utilization and then providing possible candidate reconfiguration plans that meet the SLA requirements to clients with estimated costs (shown in Table VII): i) Change journal from HDD to SSD for all 9 OSDs, ii) change to 6+3 erasure code (EC) from triple replication, or iii) Increase number of OSDs from 9 to 12. As, in this first example, the SLA OK ratio drop is mainly due to POST throughput increase (which is much higher than the increase in GET), SuperCell recommends that changing journals from HDD to SSD would have the most significant effect in meeting the SLA again with the minimal recovery time and cost.

FIG. 6 also shows the results of the transition of the SLA OK ratio with a reconfiguration that changes the journal from using HDD to SSD, triggered by the fact that the SLA OK ratio fell below 90%. After reconfiguration, the SLA OK ratio is again satisfied at the 99th percentile during the final 15 minutes.

TABLE VII

PUBLIC PRICE ESTIMATION ON EACH CONFIGURATION

| | Configuration | | | | Price [$/month] | | |
|---|---|---|---|---|---|---|---|
| # | Encode | OSDs/ VMs | Journal | Data | Storage/ OSD | Computing | Storage | Total |
| Initial | x3 Repl | 9/3 | HDD | HDD | 21.6 TB | 440.35 | 8958.0 | 9398.35 |
| candidate i | x3 Repl | 9/3 | SSD | HDD | 21.6 TB | 440.35 | 8978.7 | 9419.05 |
| candidate ii | 6 + 3 EC | 9/3 | HDD | HDD | 10.83 TB | 440.35 | 4387.5 | 4827.85 |
| candidate iii | x3 Repl | 12/4 | HDD | HDD | 16.25 TB | 584.35 | 8985.6 | 9569.95 |
| final | x3 Repl | 12/4 | SSD | SSD | 16.25 TB | 584.35 | 19968.0 | 20552.35 |

To validate that SuperCell can effectively recommend effective reconfiguration options to clients with various types of workload changes, a second experiment was designed. In this experiment, the read/write throughput increased twice due to the increase in offered load. Specifically, the POST throughput increases from 10 MB/s to 17 MB/s at the $37^{th}$ minute and from 17 MB/s to 22 MB/s on average at the $83^{rd}$ minute. The GET throughput increases from 19 MB/s to 35 MB/s at $37^{th}$ minute and from 35 MB/s to 50 MB/s on average at $83^{rd}$ minute).

Figure 7:
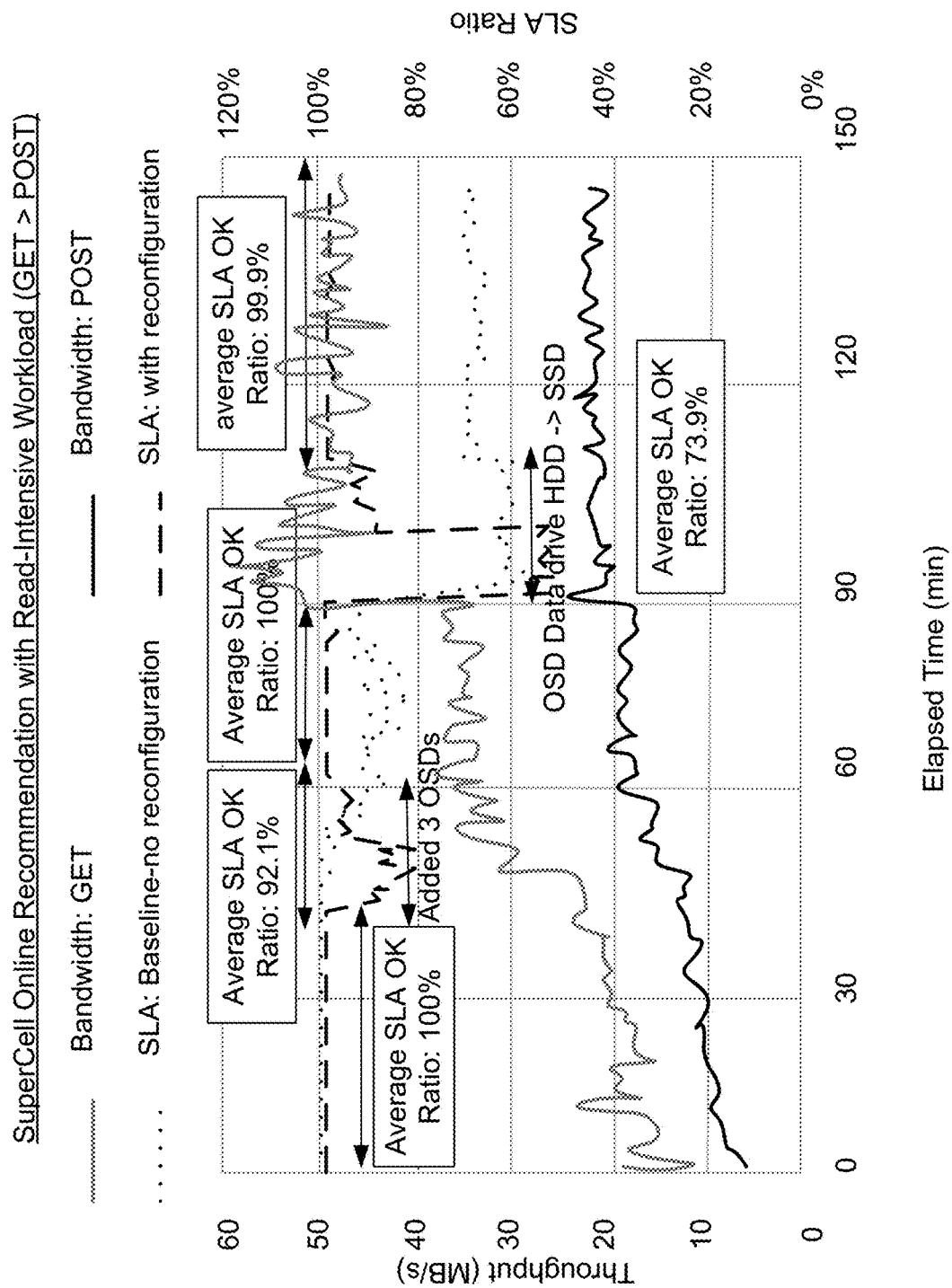
FIG. 7 shows the SLA OK ratio transition when required throughput changes in this workload.

FIG. 7 shows the SLA OK ratio transition when required throughput changes in this workload. When monitored SLA OK ratio changes (from 100% to 93.0%), the SuperCell recommendation engine recalculates media utilization for each media type, and calculates the estimated cost and SLA OK ratio for each candidate reconfiguration plan. It then lists the ones that are able to meet the new throughput requirements for the first workload increase at the 37th minute: i) change journal from HDD to SSD (not recommended as the SLA drop was mainly due to increased read workload), ii) change to 6+3 erasure code from triple replication (not recommended due to long recovery time and less increase in SLA), iii) increase OSDs from 9 to 12 (recommended as it can increase the SLA effectively and has low recovery cost). Estimated costs are shown in Table VII. The same options are provided as in the first experiment example, for simplicity sake.

For the second increase, as the required read throughput increased much more than the write throughput, simply changing journals from HDD to SSD would not improve the SLA much. In addition, with such a significant throughput increase in workload, SuperCell calculates expected SLA and costs, which indicates changing both data and journal to SSD is the most effective approach to recover the SLA, FIG. 7 shows the SLA OK ratio is recovered from 73.9% to 100% only 18 min after the recommended reconfiguration started, assuming that the operator immediately follows the recommendation and executes it. Handover from one service configuration to the next service configuration may occur in different ways. It depends on which reconfiguration option is chosen. Ceph has its own re-balance scheme so that when new OSDs are added, the workload may be rebalanced among all OSDs. The service does not stop in this case. However, if a reconfiguration involves changing storage media, OSDs may be stopped first and restarted when media change completes. When an OSD is stopped, Ceph may also automatically rebalance the workload to other working OSDs. The 18 mins it took to recover the SLA OK ratio is the time to make the change and Ceph's rebalancing time. Again, a walkthrough of FIG. 7, shows a moderate increase in throughput at the $37^{th}$ minute and another increase at the $83^{rd}$ minute. SuperCell monitors SLA OK ratio drop for the first increase and lists reconfiguration options and is recommended to increase OSDs from 9 to 12. For the second SLA drop, the GET workload increases significantly, so SuperCell recommends changing both journal and data drives from HDD to SSD. Reconfiguration is executed at $84^{th}$ minute and the SLA is recovered to 100% since the $102^{nd}$ minute.

Conventional systems are not general enough to support various types of workloads in storage systems or do not provide runtime mechanisms for reconfiguration to meet the new performance or reliability requirements.

Disclosed herein is a software-defined storage system called SuperCell that provides flexibility that matches storage configurations to varying workload characteristics. This flexibility is useful for customizing an initial deployment or as a way to orchestrate dynamic storage reconfiguration to cope with workload or other requirement changes that may occur near real-time after deployment (e.g., after being installed and in everyday operation). SuperCell may realize this flexibility by coupling a storage platform (e.g., Ceph) running on a virtualized cloud environment with predictive models that identify configurations that can satisfy workload SLAs given a set of requirements. Here the predictive models may refer to the "OSD model" and "media model" (explained in FIG. 4 and FIG. 5, respectively). Experiments using cloud storage workloads demonstrate that SuperCell may reduce the cost of an initial storage configuration by 48%, while meeting 99th percentile SLAs, and that it may adapt to workload changes and regain SLAs by dynamically changing the deployed storage configuration. SuperCell is capable of providing a scalable, adaptive, or flexible storage system for cloud workloads.

SuperCell may reconfigure storage platforms (e.g., using various Ceph knobs) after initial deployment. Reconfiguring of the storage platform may include growing the number of OSDs through rebalancing, changing the journal from HDD to SSD, or changing the replication method, among other things.

Conventional storage systems (also refereed herein as storage platforms) may attempt to improve performance to a certain degree, but the improvement may be significantly less then SuperCell since the conventional storage system is still subject to the same resource capacity constraint. SuperCell may decouple cloud applications from this fixed capacity constraint, which allows resources to be added to handle varying workloads by updating storage system configurations rather than just trying resource or utility optimization within a fixed configuration.

Figure 8:
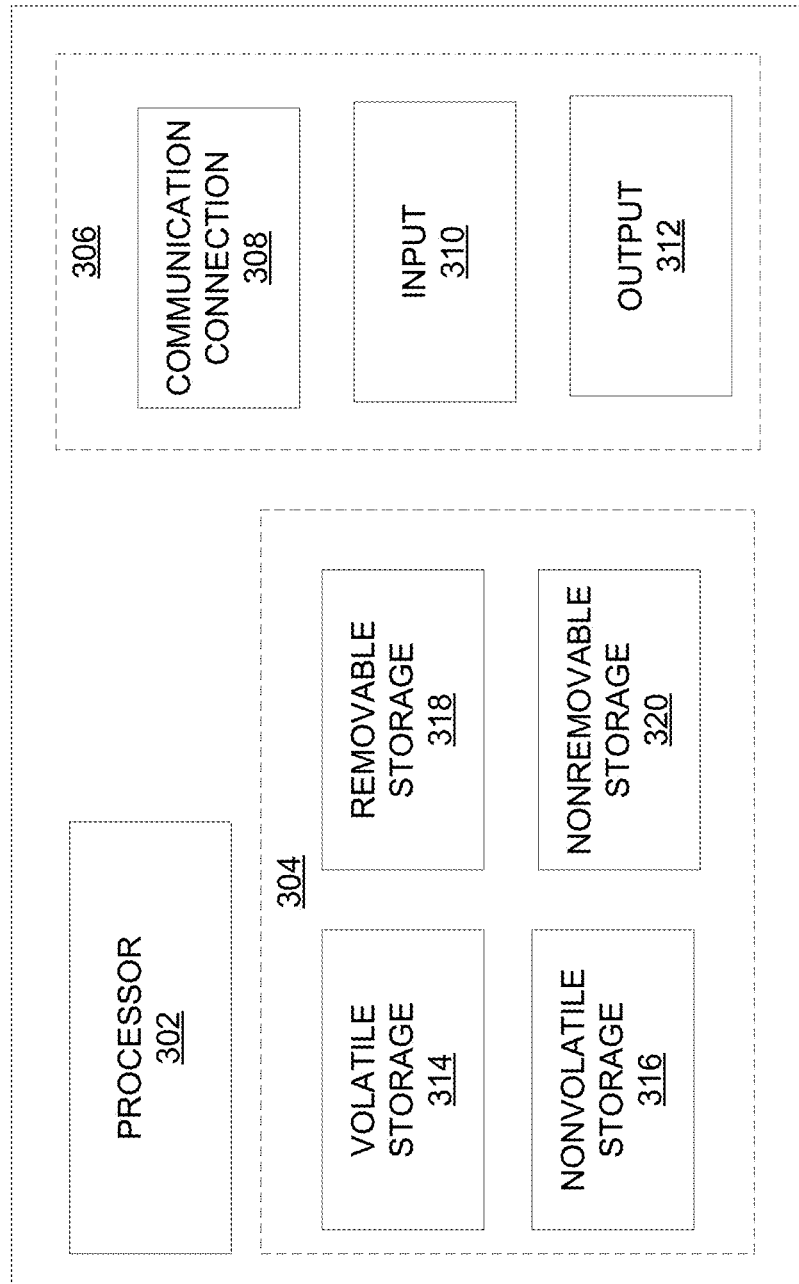
FIG. 8 illustrates a schematic of an exemplary network device.

FIG. 8 is a block diagram of network device 300 that may be connected to or comprise a component of system 80. Network device 300 may comprise hardware or a combination of hardware and software. The functionality to facilitate telecommunications via a telecommunications network may reside in one or combination of network devices 300. Network device 300 depicted in FIG. 8 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an automatic location function server (ALFS), a gateway mobile location center (GMLC), a radio access network (RAN), a serving mobile location center (SMLC), or the like, or any appropriate combination thereof. It is emphasized that the block diagram depicted in FIG. 8 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength. As evident from the description herein, network device 300 is not to be construed as software per se.

In addition to processor 302 and memory 304, network device 300 may include an input/output system 306. Processor 302, memory 304, and input/output system 306 may be coupled together (coupling not shown in FIG. 8) to allow communications between them. Each portion of network device 300 may comprise circuitry for performing functions associated with each respective portion. Thus, each portion may comprise hardware, or a combination of hardware and software. Accordingly, each portion of network device 300 is not to be construed as software per se. Input/output system 306 may be capable of receiving or providing information from or to a communications device or other network entities configured for telecommunications. For example input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, Zig-Bee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 9:
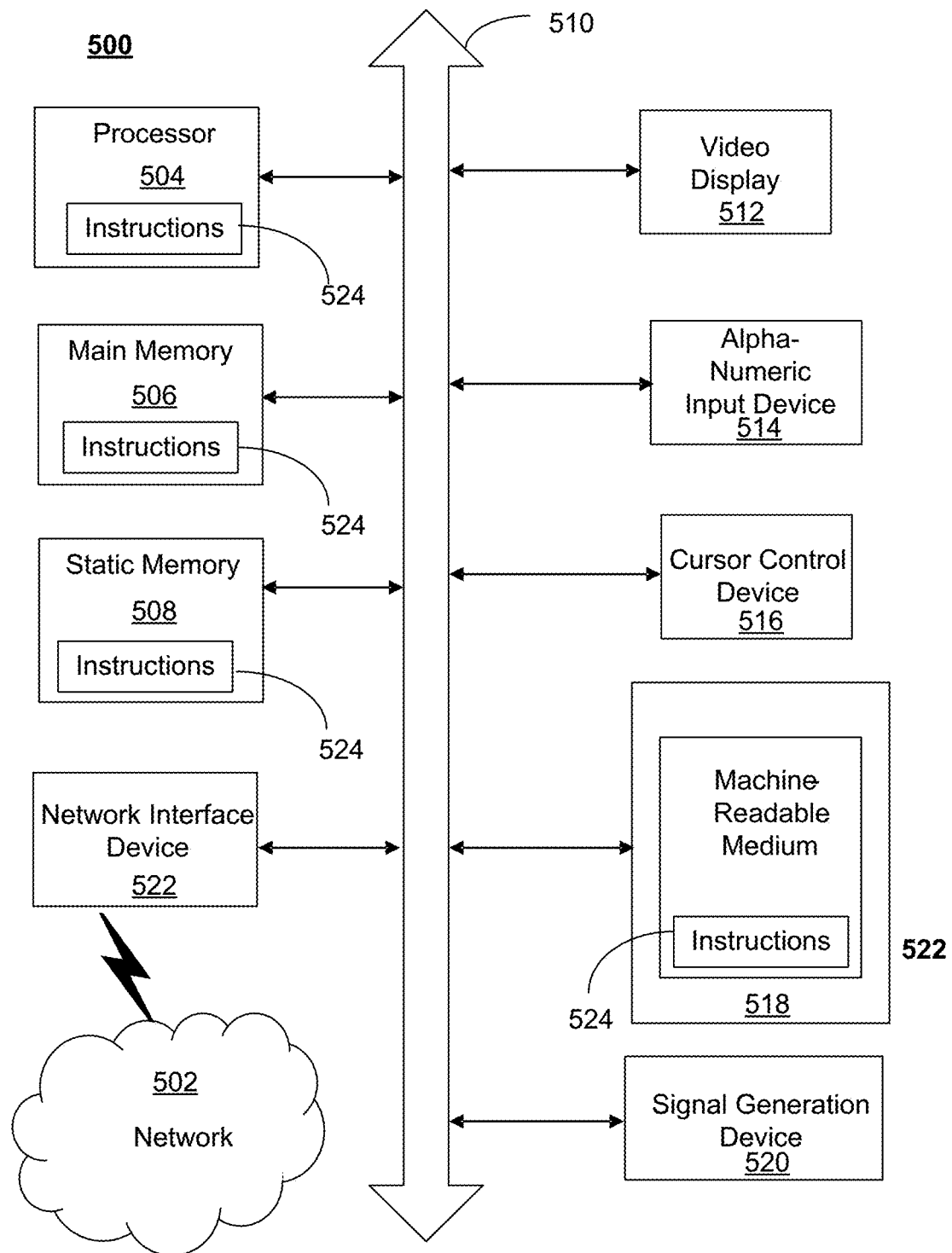
FIG. 9 illustrates an exemplary communication system that provides wireless telecommunication services over wireless communication networks.

FIG. 9 depicts an exemplary diagrammatic representation of a machine in the form of a computer system 500 within which a set of instructions, when executed, may cause the machine to perform any one or more of the methods described above. One or more instances of the machine can operate, for example, as processor 302, mobile device 91, server 92, and other devices of FIG. 1 and FIG. 1. In some embodiments, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the embodiments described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium 524 on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

Figure 10A:
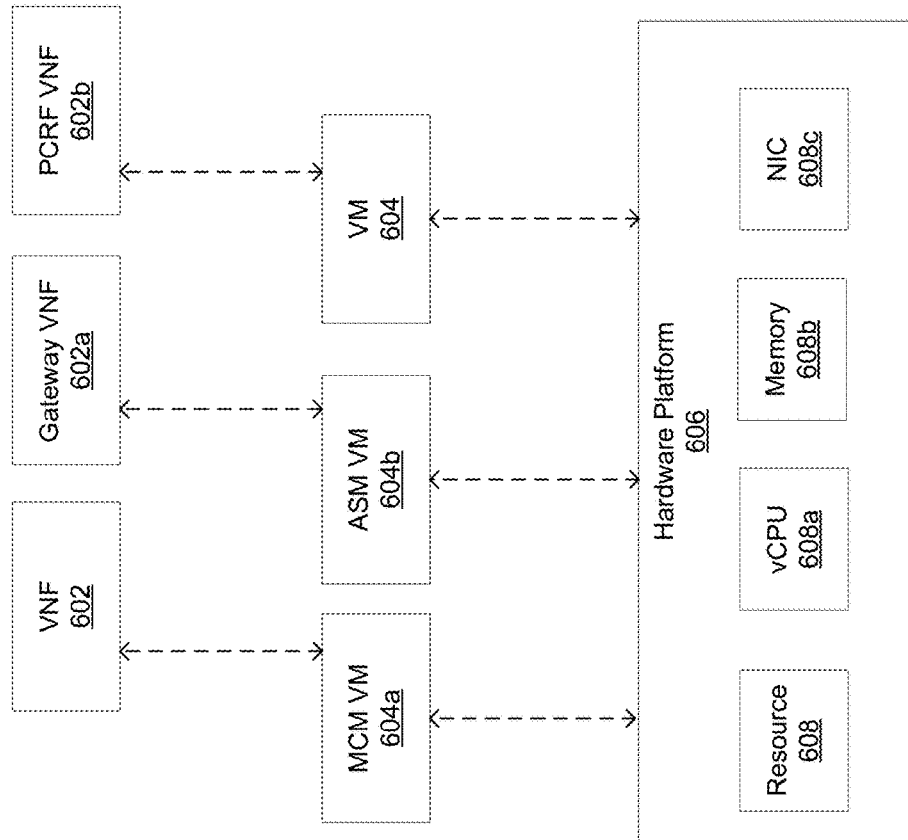
FIG. 10A is a representation of an exemplary network.

FIG. 10a is a representation of an exemplary network 600. Network 600 (e.g., physical network 93 or cloud storage network 90) may comprise an SDN—that is, network 600 may include one or more virtualized functions implemented on general purpose hardware, such as in lieu of having dedicated hardware for every network function. That is, general purpose hardware of network 600 may be configured to run virtual network elements to support communication services, such as mobility services, including consumer services and enterprise services. These services may be provided or measured in sessions.

A virtual network functions (VNFs) 602 may be able to support a limited number of sessions. Each VNF 602 may have a VNF type that indicates its functionality or role. For example, FIG. 10a illustrates a gateway VNF 602a and a policy and charging rules function (PCRF) VNF 602b. Additionally or alternatively, VNFs 602 may include other types of VNFs. Each VNF 602 may use one or more virtual machines (VMs) 604 to operate. Each VM 604 may have a VM type that indicates its functionality or role. For example, FIG. 10a illustrates a management control module (MCM) VM 604a, an advanced services module (ASM) VM 604b, and a DEP VM 604c. Additionally or alternatively, VMs 604 may include other types of VMs. Each VM 604 may consume various network resources from a hardware platform 606, such as a resource 608, a virtual central processing unit (vCPU) 608a, memory 608b, or a network interface card (NIC) 608c. Additionally or alternatively, hardware platform 606 may include other types of resources 608.

Figure 10B:
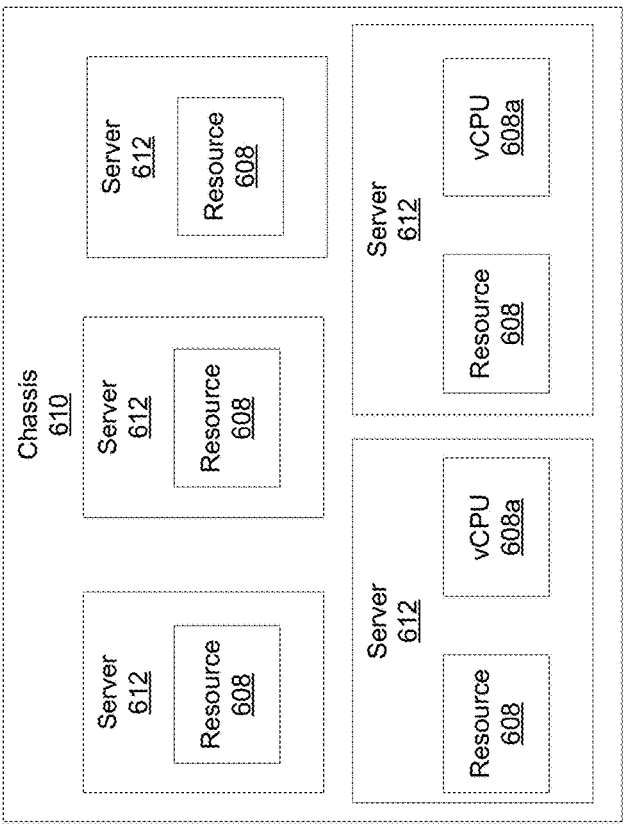
FIG. 10B is a representation of an exemplary hardware platform for a network.
Figure 10B:
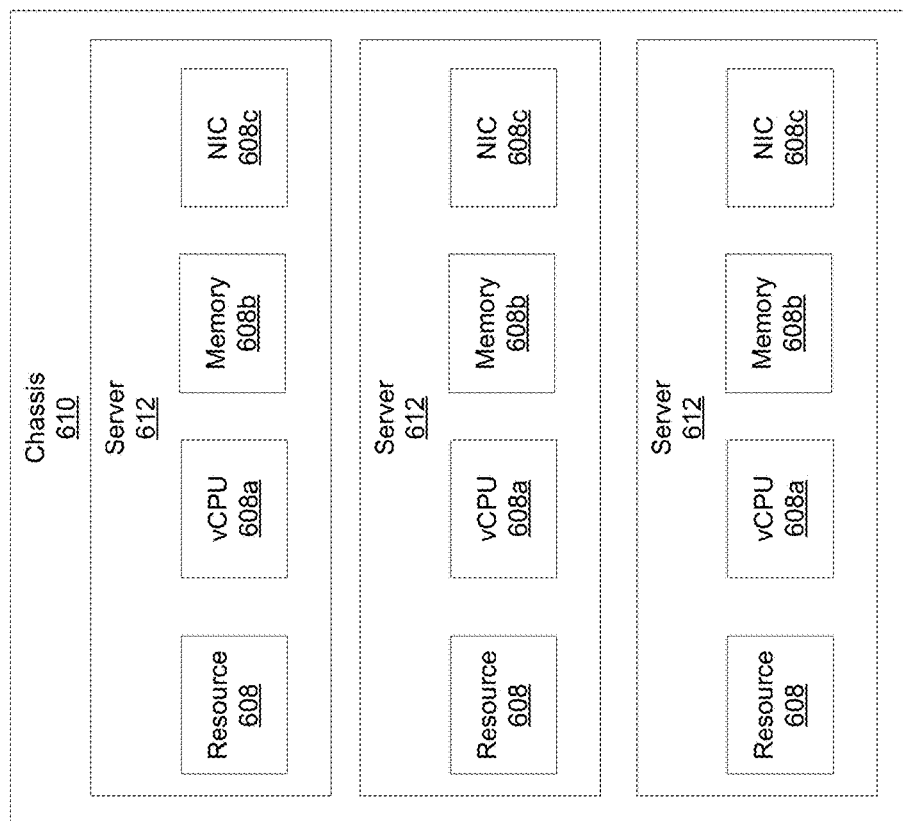

While FIG. 10a illustrates resources 608 as collectively contained in hardware platform 606, the configuration of hardware platform 606 may isolate, for example, certain memory 608c from other memory 608c. FIG. 10b provides an exemplary implementation of hardware platform 606.

Hardware platform 606 may comprise one or more chassis 610. Chassis 610 may refer to the physical housing or platform for multiple servers or other network equipment. In an aspect, chassis 610 may also refer to the underlying network equipment. Chassis 610 may include one or more servers 612. Server 612 may comprise general purpose computer hardware or a computer. In an aspect, chassis 610 may comprise a metal rack, and servers 612 of chassis 610 may comprise blade servers that are physically mounted in or on chassis 610.

Each server 612 may include one or more network resources 608, as illustrated. Servers 612 may be communicatively coupled together (not shown) in any combination or arrangement. For example, all servers 612 within a given chassis 610 may be communicatively coupled. As another example, servers 612 in different chassis 610 may be communicatively coupled. Additionally or alternatively, chassis 610 may be communicatively coupled together (not shown) in any combination or arrangement.

The characteristics of each chassis 610 and each server 612 may differ. For example, FIG. 10b illustrates that the number of servers 612 within two chassis 610 may vary. Additionally or alternatively, the type or number of resources 610 within each server 612 may vary. In an aspect, chassis 610 may be used to group servers 612 with the same resource characteristics. In another aspect, servers 612 within the same chassis 610 may have different resource characteristics.

Given hardware platform 606, the number of sessions that may be instantiated may vary depending upon how efficiently resources 608 are assigned to different VMs 604. For example, assignment of VMs 604 to particular resources 608 may be constrained by one or more rules. For example, a first rule may require that resources 608 assigned to a particular VM 604 be on the same server 612 or set of servers 612. For example, if VM 604 uses eight vCPUs 608a, 1 GB of memory 608b, and 2 NICs 608c, the rules may require that all of these resources 608 be sourced from the same server 612. Additionally or alternatively, VM 604 may require splitting resources 608 among multiple servers 612, but such splitting may need to conform with certain restrictions. For example, resources 608 for VM 604 may be able to be split between two servers 612. Default rules may apply. For example, a default rule may require that all resources 608 for a given VM 604 must come from the same server 612.

An affinity rule may restrict assignment of resources 608 for a particular VM 604 (or a particular type of VM 604). For example, an affinity rule may require that certain VMs 604 be instantiated on (that is, consume resources from) the same server 612 or chassis 610. For example, if VNF 602 uses six MCM VMs 604a, an affinity rule may dictate that those six MCM VMs 604a be instantiated on the same server 612 (or chassis 610). As another example, if VNF 602 uses MCM VMs 604a, ASM VMs 604b, and a third type of VMs 604, an affinity rule may dictate that at least the MCM VMs 604a and the ASM VMs 604b be instantiated on the same server 612 (or chassis 610). Affinity rules may restrict assignment of resources 608 based on the identity or type of resource 608, VNF 602, VM 604, chassis 610, server 612, or any combination thereof.

An anti-affinity rule may restrict assignment of resources 608 for a particular VM 604 (or a particular type of VM 604). In contrast to an affinity rule—which may require that certain VMs 604 be instantiated on the same server 612 or chassis 610—an anti-affinity rule requires that certain VMs 604 be instantiated on different servers 612 (or different chassis 610). For example, an anti-affinity rule may require that MCM VM 604a be instantiated on a particular server 612 that does not contain any ASM VMs 604b. As another example, an anti-affinity rule may require that MCM VMs 604a for a first VNF 602 be instantiated on a different server 612 (or chassis 610) than MCM VMs 604a for a second VNF 602. Anti-affinity rules may restrict assignment of resources 608 based on the identity or type of resource 608, VNF 602, VM 604, chassis 610, server 612, or any combination thereof.

Within these constraints, resources 608 of hardware platform 606 may be assigned to be used to instantiate VMs 604, which in turn may be used to instantiate VNFs 602, which in turn may be used to establish sessions. The different combinations for how such resources 608 may be assigned may vary in complexity and efficiency. For example, different assignments may have different limits of the number of sessions that can be established given a particular hardware platform 606.

For example, consider a session that may require gateway VNF 602a and PCRF VNF 602b. Gateway VNF 602a may require five VMs 604 instantiated on the same server 612, and PCRF VNF 602b may require two VMs 604 instantiated on the same server 612. (Assume, for this example, that no affinity or anti-affinity rules restrict whether VMs 604 for PCRF VNF 602b may or must be instantiated on the same or different server 612 than VMs 604 for gateway VNF 602a.) In this example, each of two servers 612 may have sufficient resources 608 to support 10 VMs 604. To implement sessions using these two servers 612, first server 612 may be instantiated with 10 VMs 604 to support two instantiations of gateway VNF 602a, and second server 612 may be instantiated with 9 VMs: five VMs 604 to support one instantiation of gateway VNF 602a and four VMs 604 to support two instantiations of PCRF VNF 602b. This may leave the remaining resources 608 that could have supported the tenth VM 604 on second server 612 unused (and unusable for an instantiation of either a gateway VNF 602a or a PCRF VNF 602b). Alternatively, first server 612 may be instantiated with 10 VMs 604 for two instantiations of gateway VNF 602a and second server 612 may be instantiated with 10 VMs 604 for five instantiations of PCRF VNF 602b, using all available resources 608 to maximize the number of VMs 604 instantiated.

Consider, further, how many sessions each gateway VNF 602a and each PCRF VNF 602b may support. This may factor into which assignment of resources 608 is more efficient. For example, consider if each gateway VNF 602a supports two million sessions, and if each PCRF VNF 602b supports three million sessions. For the first configuration—three total gateway VNFs 602a (which satisfy the gateway requirement for six million sessions) and two total PCRF VNFs 602b (which satisfy the PCRF requirement for six million sessions)—would support a total of six million sessions. For the second configuration—two total gateway VNFs 602a (which satisfy the gateway requirement for four million sessions) and five total PCRF VNFs 602b (which satisfy the PCRF requirement for 15 million sessions)—would support a total of four million sessions. Thus, while the first configuration may seem less efficient looking only at the number of available resources 608 used (as resources 608 for the tenth possible VM 604 are unused), the second configuration is actually more efficient from the perspective of being the configuration that can support more the greater number of sessions.

To solve the problem of determining a capacity (or, number of sessions) that can be supported by a given hardware platform 605, a given requirement for VNFs 602 to support a session, a capacity for the number of sessions each VNF 602 (e.g., of a certain type) can support, a given requirement for VMs 604 for each VNF 602 (e.g., of a certain type), a give requirement for resources 608 to support each VM 604 (e.g., of a certain type), rules dictating the assignment of resources 608 to one or more VMs 604 (e.g., affinity and anti-affinity rules), the chassis 610 and servers 612 of hardware platform 606, and the individual resources 608 of each chassis 610 or server 612 (e.g., of a certain type), an integer programming problem may be formulated.

As described herein, a telecommunications system wherein management and control utilizing a software designed network (SDN) and a simple IP are based, at least in part, on user equipment, may provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

While examples of a telecommunications system in which adaptive SDS for cloud storage workloads messages can be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes an device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While a telecommunications system has been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims.

In describing preferred methods, systems, or apparatuses of the subject matter of the present disclosure—adaptive SDS for cloud storage workloads—as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose. In addition, the use of the word "or" is generally used inclusively unless otherwise provided herein. Parameters and metrics are used interchangeably, herein.

This written description uses examples to enable any person skilled in the art to practice the claimed invention, including making and using any devices or systems and performing any incorporated methods. The patentable scope of the invention is defined by the claims, and may include other examples that occur to those skilled in the art (e.g., skipping steps, combining steps, or adding steps between exemplary methods disclosed herein). Such other examples are intended to be within the scope of the claims if they have structural elements that do not differ from the literal language of the claims, or if they include equivalent structural elements with insubstantial differences from the literal languages of the claims.

What is claimed:

1. An apparatus comprising:
a processor; and
a memory coupled with the processor, the memory comprising executable instructions that when executed by the processor cause the processor to effectuate operations comprising:
obtaining one or more metrics associated with a cloud storage network, wherein the cloud storage network comprises a storage system;
determining that a first metric of the one or more metrics reached a first threshold;
based on the first metric reaching the first threshold, determining one or more storage configuration candidates for reconfiguring the storage system of the cloud storage network to operate within the first threshold; and
reconfiguring the storage system of the cloud storage network based on the one or more storage configuration candidates for reconfiguring the storage system of the cloud storage network to operate within the first threshold, wherein the reconfiguring of the storage system comprises updating a first interface of the storage system to a second interface of the storage system, wherein the second interface of the storage system comprises object storage, block storage, or file storage, wherein the first interface of the storage system and the second interface of the storage system are different.

2. The apparatus of claim 1, wherein the operations further comprise selecting a first storage configuration candidate for reconfiguring the storage system based on an indication that an operation of the first storage configuration candidate is within a threshold of a service level agreement requirement.

3. The apparatus of claim 1, wherein the one or more metrics comprise a throughput for write data on the at least the object storage, block storage, or file storage of the storage system.

4. The apparatus of claim 1, wherein the one or more metrics comprise a bandwidth utilization for a first media.

5. The apparatus of claim 1, wherein the reconfiguring of the storage system comprises updating a configuration of an encoding.

6. The apparatus of claim 1, wherein the reconfiguring of the storage system comprises updating a configuration of a type of storage drive or use of cache.

7. The apparatus of claim 1, wherein the reconfiguring the storage system of the cloud storage network is further based on a prediction of the one or more storage configuration candidates to restore the cloud storage network operation in the least amount of time.

8. The apparatus of claim 1, wherein the reconfiguring the storage system of the cloud storage network is further based on a prediction of the one or more storage configuration candidates to restore the cloud storage network operation with least amount of cost.

9. The apparatus of claim 1, wherein the first storage configuration candidate further comprises a configuration of a write journal.

10. A method comprising:
obtaining one or more metrics associated with a cloud storage network, wherein the cloud storage network comprises a storage system;

determining that a first metric of the one or more metrics reached a first threshold;

based on the first metric reaching the first threshold, determining one or more storage configuration candidates for reconfiguring the storage system of the cloud storage network to operate within the first threshold; and reconfiguring the storage system of the cloud storage network based on the one or more storage configuration candidates for reconfiguring the storage system of the cloud storage network to operate within the first threshold, wherein the reconfiguring of the storage system comprises updating a first interface of the storage system to a second interface of the storage system, wherein the second interface of the storage system comprises object storage, block storage, or file storage, wherein the first interface of the storage system and the second interface of the storage system are different.

11. The method of claim 10, wherein the one or more metrics comprise a throughput for read data.

12. The method of claim 10, wherein the one or more metrics comprise a throughput for write data.

13. The method of claim 10, wherein the one or more metrics comprise a bandwidth utilization for a first media.

14. The method of claim 10, wherein the one or more metrics comprise a response time for the cloud storage network.

15. The method of claim 10, wherein the one or more metrics comprise a response time for the first device of the cloud storage network.

16. The method of claim 10, wherein the reconfiguring the storage system of the cloud storage network is further based on a prediction of the one or more storage configuration candidates to restore the cloud storage network operation in the least amount of time.

17. The method of claim 10, wherein the reconfiguring the storage system of the cloud storage network is further based on a prediction of the one or more storage configuration candidates to restore the cloud storage network operation with least amount of cost.

\* \* \* \* \*